(12) United States Patent
Gehlot et al.

(10) Patent No.: US 7,072,408 B2
(45) Date of Patent: Jul. 4, 2006

(54) METHOD AND SYSTEM FOR USING POWER LINES FOR SIGNALING, TELEPHONY AND DATA COMMUNICATIONS

(75) Inventors: Narayan Lal Gehlot, Sayreville, NJ (US); Victor B. Lawrence, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 716 days.

(21) Appl. No.: 09/788,959

(22) Filed: Feb. 20, 2001

(65) Prior Publication Data

US 2002/0113689 A1 Aug. 22, 2002

(51) Int. Cl.
*H04L 27/00* (2006.01)

(52) U.S. Cl. .................. 375/259; 375/377; 340/310.11; 340/538

(58) Field of Classification Search ................ 340/538, 340/288, 310.01, 310.11; 375/257, 259, 375/260, 316, 342, 325, 377
See application file for complete search history.

(56) References Cited

U.S. PATENT DOCUMENTS

| 2,345,678 | A | * | 4/1944 | Lamar .......................... 83/171 |
| 3,689,886 | A | * | 9/1972 | Durkee ................... 340/825.26 |
| 3,942,168 | A | * | 3/1976 | Whyte .................... 340/310.01 |
| 4,058,678 | A | | 11/1977 | Dunn et al. |
| 4,599,598 | A | * | 7/1986 | Komoda et al. ....... 340/310.02 |
| 4,713,841 | A | * | 12/1987 | Porter et al. ................. 398/191 |
| 4,831,662 | A | * | 5/1989 | Kuhn .......................... 398/192 |
| 4,866,757 | A | | 9/1989 | Nilssen |
| 5,025,456 | A | | 6/1991 | Ota et al. |
| 5,066,939 | A | | 11/1991 | Mansfield, Jr. |
| 5,070,522 | A | | 12/1991 | Nilssen |
| 5,191,462 | A | | 3/1993 | Gitlin et al. |
| 5,678,987 | A | * | 10/1997 | Timuska ....................... 418/97 |
| 5,684,450 | A | | 11/1997 | Brown |
| 5,708,701 | A | | 1/1998 | Houvig et al. |
| 5,737,366 | A | | 4/1998 | Gehlot |
| 5,933,071 | A | | 8/1999 | Brown |
| 5,937,342 | A | | 8/1999 | Kline |
| 5,949,327 | A | | 9/1999 | Brown |
| 6,006,071 | A | * | 12/1999 | Roberts et al. ............ 455/63.1 |
| 6,229,433 | B1 | * | 5/2001 | Rye et al. .............. 340/310.12 |

* cited by examiner

*Primary Examiner*—Jean B. Corrielus

(57) ABSTRACT

The present invention provides a burst mode power line data network system having at least one burst mode power line transmitter (BMPLT) and at least one burst mode power line receiver (BMPLR) for enabling signaling, telephony and data communications via power lines without using carrier frequencies. The BMPLT transmits line encoded bursts of information via a power line to the BMPLR which receives the line encoded bursts of information and has a maximum inter-packet idle time of only one bit between bursts. The invention permits the use of AC coupling in a receiver and results in outputting data with constant pulse widths irrespective of optical signal power levels, etc. In one embodiment, a receiver has a wide dynamic range, is highly stable, may be used over all frequencies of interest without developing high speed electronics or optical components, and has no sensitivity penalty as compared to existing burst mode/packet mode receivers. Because the receiver completely removes common signals, base line wander problems are also removed. The main advantages of the burst mode power line data network system of the present invention is that carrier frequencies and their harmonics are eliminated and therefore signals can be scaled at higher data rates; interference is minimized, since the total time the signals are present on the power line is dramatically reduced; and there is no need for clock recovery in homes and businesses, and therefore modules for implementing the system are inexpensive.

7 Claims, 5 Drawing Sheets

METHOD AND SYSTEM FOR USING POWER LINES FOR SIGNALING, TELEPHONY AND DATA COMMUNICATIONS

FIELD OF THE INVENTION

The present invention relates generally to communications. More specifically, the invention describes a method and system for using power lines for signaling, telephony and data communications.

BACKGROUND OF THE INVENTION

In many undeveloped areas and undeveloped countries, wireless communications offers a sensible method of providing communications without the need for major expenditures of funds for outside-plant communications infrastructure, e.g., telephone poles, lines, and other facilities. However, even with certain so-called fixed "wireless" systems, some communications wiring is still required within a home or business so that communications devices, such as telephones, facsimile machines, and computers, can be connected to the fixed wireless terminal serving that home or business. Once communications between the devices and the wireless terminal is established, the wireless terminal communicates in a true wireless fashion to other wireless terminals or to a base station thereby avoiding the more extensive outside-plant communications infrastructure.

The installation of communications wiring and equipment, in order to interface the home or business with a wireless system, is a significant cost for a household or business, one which often deters those in undeveloped countries from wiring households or businesses for wireless communications.

However, unlike outside-plant communications infrastructure and communications wiring which has not been extensively installed, electrical power in various forms has reached many homes throughout the world via power lines. Therefore, in many third-world countries, power wiring interfaced with power lines may exist within a home or business, even though communications wiring might not.

Systems have been developed which couple telecommunications signals to a power distribution system. These systems utilize the power wires for the transmission of communications data and signals. Thus, these systems overcome the need to install communication wiring and equipment in providing a home or business with communications capabilities.

These systems generally entail a power line network architecture having a transmitter and a receiver designed to transfer a large amount of data from point-to-point, i.e., from one or more sources to one receiver, using bi-directional multiplexing. For multi-point networks, a time division multiple access (TDMA) protocol is often utilized. In such a multi-point network, each "packet" of information is multiplexed by a transmitter in a time sequence on a power line. A receiver at a central node must handle each packet as a burst of data coming from multiple sources where the packets have a wide range of input powers.

Preferably, such a receiver should have a wide dynamic range, high sensitivity and minimum inter packet idle time (IPIT) between any two adjacent packets having a high adjacent packet power ratio (APPR). The receiver should be able to handle non-synchronous packets of high APPR, separated by a small amount of time. An ideal IPIT is one nonretum-to-zero (NRZ) data bit in length (time) and is equal to $2 \times T_b$, where ($\frac{1}{2} \times T_b$) is a data clock frequency.

A receiver used to receive such bursts of data, hereafter a "burst mode receiver", must be able to overcome a number of difficulties. First, extracting timing information from incoming data is difficult to do. Second, tracking maximum and minimum voltage swings on a real-time basis in order to utilize decision threshold is also difficult. No amount of circuit training can aid in decision extraction without real-time signal processing. Third, the receiver must be able to eliminate unwanted high-energy power line frequencies, remove spectral shaping for NRZ-coded data, and eliminate pulse width distortion resulting from APPR. Fourth, the receiver has to receive packets of smaller signal power amplitude in the presence of large background DC frequencies or power line frequencies.

Most conventional receivers used in coupling data to power lines use AC coupling. Coupling capacitors used in existing AC coupled systems are examples of real-time processors which establish ideal thresholds after a few pulses. However, coupling capacitors introduce base line "wander" problems due to long strings of "1"s or "0"s in NRZ data packets, typically used in coupling data to power line networks.

Further, there exist other major disadvantages in using a power distribution network or power transmission network for the transmission of communications data. One major disadvantage is the interference of the communications data and signals by electromotive and electrostatic forces present in a typical power line. Another major disadvantage is the adverse effect that out-of-band DC and low frequencies inherent in the power line, as well as carrier frequencies and their harmonics present in the power line, have on communications data and signals propagating through the power line. Yet, another major disadvantage is that the communications data and signals are not by design inserted at a point along the power spectrum having the minimum interference. Further still, another major disadvantage is the sipping of frequencies and associated harmonics of communications data and signals into the power line, thereby affecting the power spectrum. Finally, another major disadvantage is the inability of prior art power line communication systems to use base-band communications data and telephone messages, since they use carrier modulation schemes. The carrier is on most of the time, either modulated with data or unmodulated. The total amount of undesired electrical interference thus increases with prior art power lines.

Also, power line usage with masers makes the power line susceptible to magnetic field interference, thereby creating signal strength variations. Masers can also be problematic in hospitals using MRI machines and other magnetic sensors, such as Hall effect sensors.

SUMMARY OF THE INVENTION

The present invention provides a burst mode power line data network system that includes at least two burst mode power line transmitters (BMPLTs), one of which has a transmitter that transmits at least a single data bit stream of line encoded bursts of information via the electrical power line, each data bit of the data bit stream having an original pulse width, the data bit stream includes an amount of delay to be used by at least one of the BMPLTs after receiving the data bit stream before transmitting the data bit stream; and delay circuitry that delays a received data bit stream before transmitting it to at least one of several burst mode power line receivers (BMPLRs) to compensate for propagation errors introduced by the BMPLRs, which are also coupled to the electrical power line, after receiving the data bit stream. The amount of delay to be used by the delay circuitry is preferably a one-bit delay.

Each BMPLR includes a splitter for splitting an input data bit stream into a first data bit stream and a second data bit stream; a delay arranged to delay information in the second data bit stream relative to information in the first data bit stream; a subtractor including an amplifier for generating a bipolar difference data bit stream from the information in the delayed, second data bit stream and the information in the first data bit stream; at least one comparator for outputting a first bit when a voltage level of a first signal in the bipolar difference data bit stream exceeds a threshold voltage and outputting a second bit when a voltage level of a second signal in the bipolar difference data bit stream exceeds the threshold voltage; and a flip-flop for regenerating means for regenerating each data bit in the line encoded data bit stream using the first and second bits, each regenerated data bit having a regenerated pulse width substantially equal to said original pulse width.

The BMPLT and BMPLR are housed within respective central nodes located outside the home or business, i.e., in the field, and are coupled to the electrical power line of the data network system. Each power line in the network is connected via step-down transformers to power wiring within user facilities, such as a households or businesses, as known in the art. All burst mode power line transmitters and receivers are equipped with a transformer and optoisolator (TAO), as known in the art.

In operation, a BMPLT at a central node in the burst mode power line data network system couples base-band data and communications data to a power line and transmits line encoded bursts of information, e.g., nonretum-to-zero (NRZ) data packets, received from multiple sources to a BMPLR at another central node. The BMPLT sends out a burst of packet data, for example, a header having five bytes plus 48 bytes of information, to users connected to the central node. The packet data format can be any type, such as ATM, FDDI, etc.

BRIEF DESCRIPTION OF THE DRAWINGS

The invention, together with its various features and advantages can be readily understood from the following more detailed description taken in conjunction with the accompanying drawings in which.

DETAILED DESCRIPTION OF THE PREFERRED EMBODIMENTS

I. Burst Mode Power Line Data Network

Figure 1:
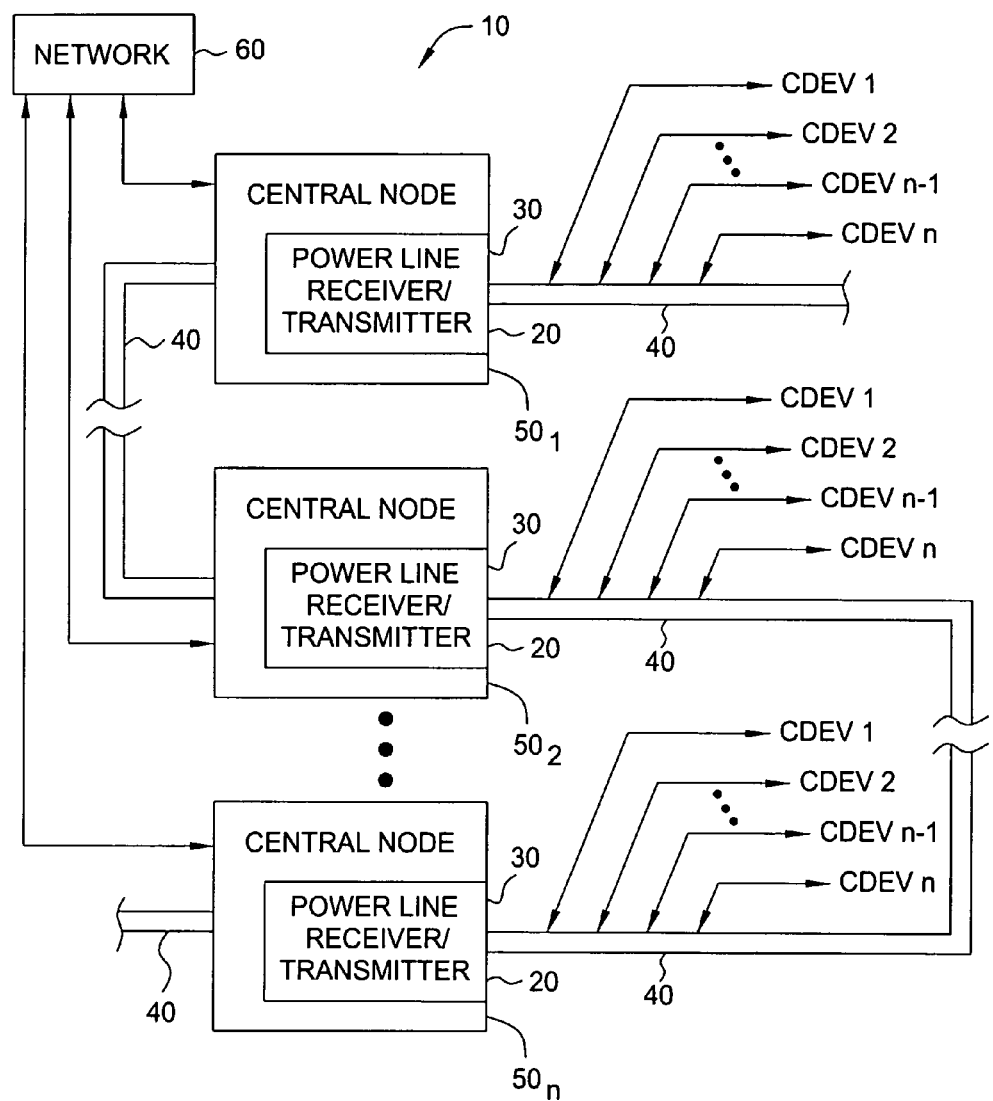
FIG. 1 is an illustration of the burst mode power line data network system according to the present invention.

A burst mode power line data network system 10 for transmitting and receiving line encoded bursts of information according to an illustrative embodiment of the invention is shown in FIG. 1 having at least one burst mode power line transmitter (BMPLT) 20 and at least one burst mode power line receiver (BMPLR) 30 for enabling signaling, telephony and data communications via an electrical power line 40 without using carrier frequencies. One BMPLT 20 and one BMPLR 30 are provided at each central node 50 which is coupled to the power line 40 of the data network system 10. All central nodes $50_1$–$50_n$ are connected to a network 60, such as a PSTN, WAN, LAN, or the Internet, and is preferably a transformer and opto-isolator (TAO), as known in the art.

Each power line 40 in the network 10 is connected via step-down transformers (not shown) to power wiring which in turn connects to communications devices CDev 1, CDev 2, CDev n–1, and CDev n, such as telephones, facsimile machines, and personal computers, within user facilities, such as a households or businesses, as known in the art. It should be noted that even though the communications devices shown by FIG. 1 as connected to the power line 40 are designated by reference signs CDev 1, CDev 2, CDev n–1, and CDev n, the communications devices are not necessarily the same communications devices. For example, CDev 1 connected to central node $50_1$ via power line 40 is not necessarily the same communications device, which is also designated by reference sign CDev 1, connected to central node $50_2$.

II. Burst Mode Power Line Transmitter

Figure 2A:
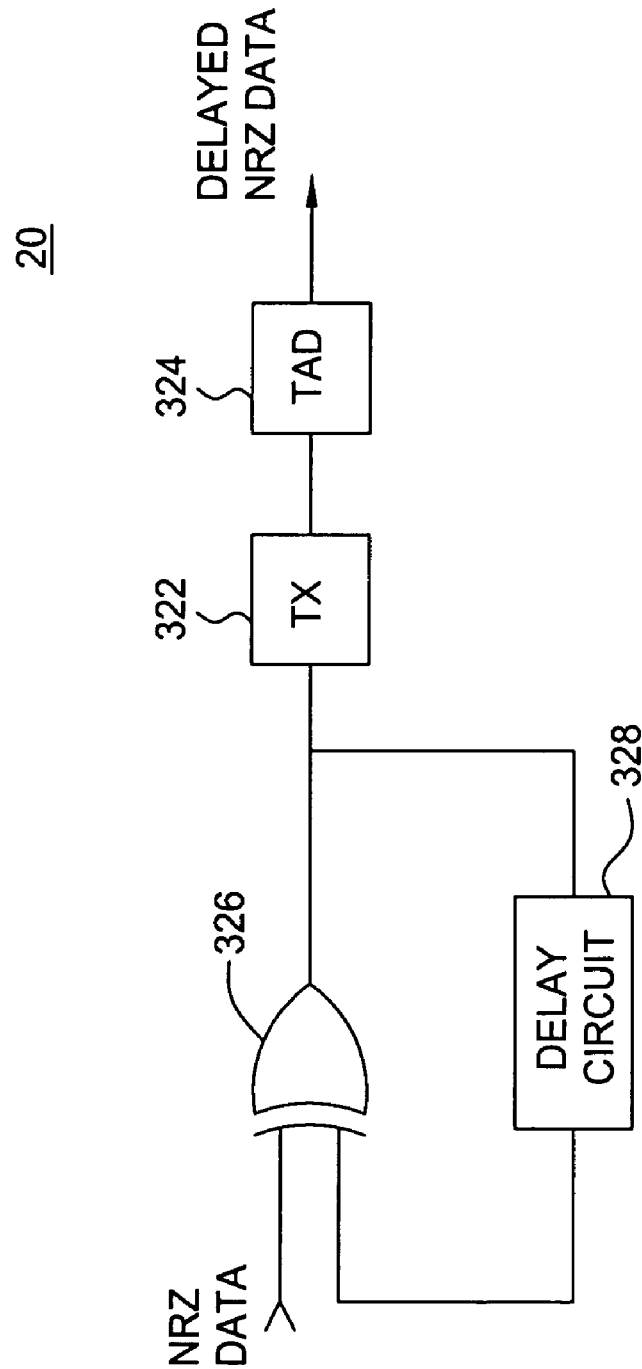
FIG. 2A is a circuit diagram of the burst mode power line transmitter according to the present invention.

In operation, a BMPLT 20 as shown by FIG. 2A, e.g. one located at central node $50_1$ of the burst mode power line data network system 10, couples base-band data and communications data to the power line 40 and transmits line encoded bursts of information received from multiple sources to a BMPLR 30, e.g., to one located at central node $50_2$. The BMPLT 20 transmits NRZ data by a transmitter 322 connected to a transformer and opto-isolator 324 (TAO) for outputting the NRZ data. The NRZ data is first fed to a logic gate 326 which also has as an input an output from a delay circuit 328. The delay circuit 328 feeds back the output of the logic gate 326 and delays the output by preferably one bit before inputting the output to the logic gate 326, as shown by FIG. 2A. Hence, the signal is transmitted by transmitter 322 with a one bit delay, thereby eliminating error propagation common in prior art communications systems.

Though an NRZ data output will be used to illustrate embodiments of the invention, it should be noted that any appropriate line encoded format, such as NRZ, differential NRZ, Manchester or RZ may be used as the output.

The BMPLT 20 sends out a burst of packet data, preferably, a header having five bytes plus 48 bytes of information, users connected to the central node 50. In the case where the burst of packet has 53 bytes, i.e., a header having five bytes plus 48 bytes of information, the first byte is for preamble use and the second byte is polling/permission to users to send data to the central node. The third byte has a specific address, and the fourth byte duplicates the specific address. The fifth byte is an address checksum byte. The 48-byte information field indicates the amount of delay to be used by each BMPLT 20 in the network 10 after receiving the packet, before transmitting the packet back to the central node 50. The purpose of sending the burst of packet data is to generate an imaginary time axis, so that the users have sufficient time between each other's transmission, in order to prevent transmissions from overlapping. For example, 128 communications devices each receive a specific transmitter delay to be used. The delay is a parameter adjusted by the BMPLR 30 for various reasons that may change the propagation time between the BMPLR 30 and the individual users.

Periodically, e.g., every 10 seconds, the BMPLT 20 broadcasts a message to all communications devices CDev 1, CDev 2, CDev n−1, CDev n to transmit a packet at the end of each delay recommended by the central node 50. The BMPLR 30 receives all the packets from the individual communications devices on the imaginary time axis and checks if the preamble and guard band are preserved. If not, a second delay will be recommended for use. A look-up propagation Delay Table (DT) is created for each communications device. The DT is updated in case there is an overlap of data.

The maximum delay seen by each communications device is determined by the total number of communications devices multiplied by the sum of the maximum propagation delay plus the packet size. For simplicity, it may be assumed that all communications devices CDev 1, CDev 2, CDev n−1, CDev n use the maximum propagation time delay with respect to each other for transmission.

III. Burst Mode Power Line Receiver

Figure 3:
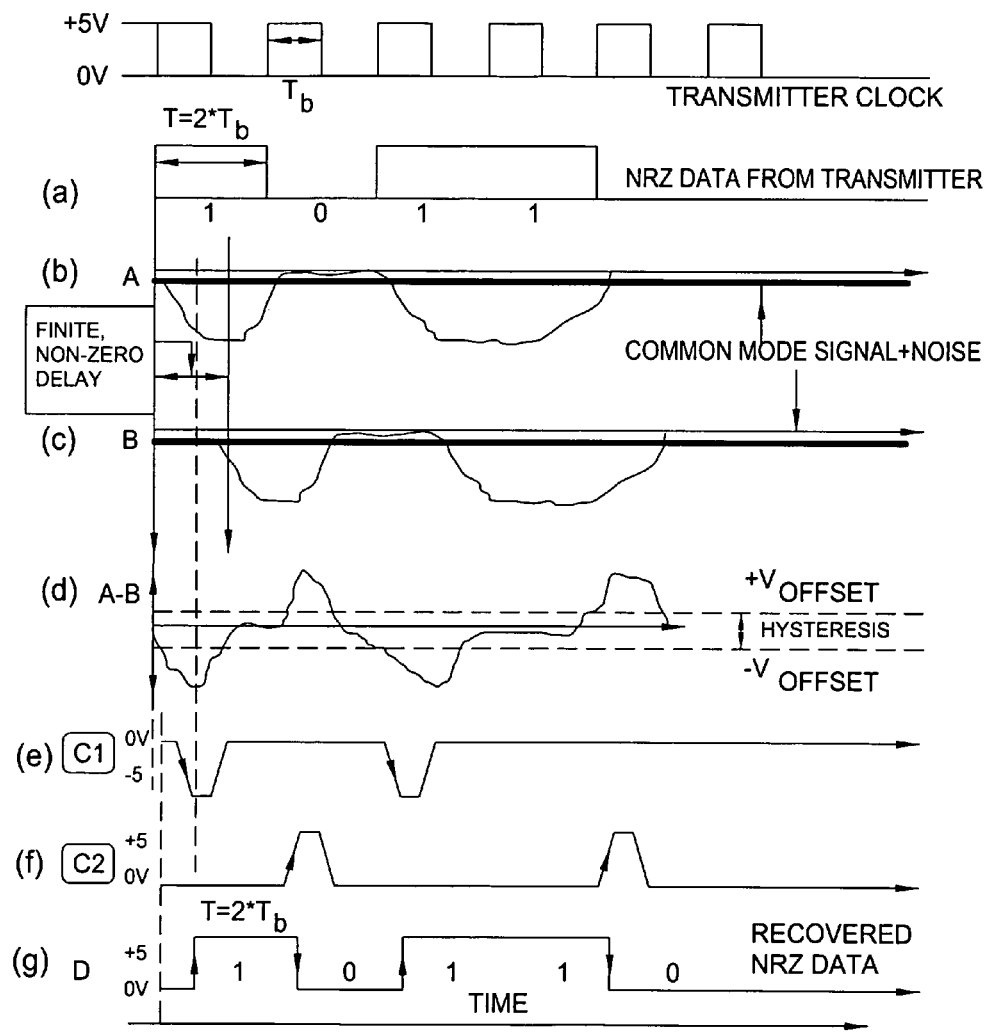
FIG. 3 illustrates several waveforms of signals at various stages of the burst mode power line receiver shown by FIG. 2B.

The BMPLR 30 creates a new signal, see FIG. 3, waveform (g), that has a bipolar, return-to-zero (BRZ) format from at least a single input data bit stream of line encoded bursts of information, such as a unipolar/unsymmetric/unbalanced NRZ signal, received from the BMPLT 20. Each data bit of the data bit stream of the BRZ waveform has an original pulse width. The BRZ waveform has no signal power at DC or zero frequency and negligible power at low frequencies. The BMPLR 30 eliminates base line "wander" and stability problems inherent in existing AC or DC coupled receivers operating with ASK pulse trains having an NRZ format.

Figure 2B:
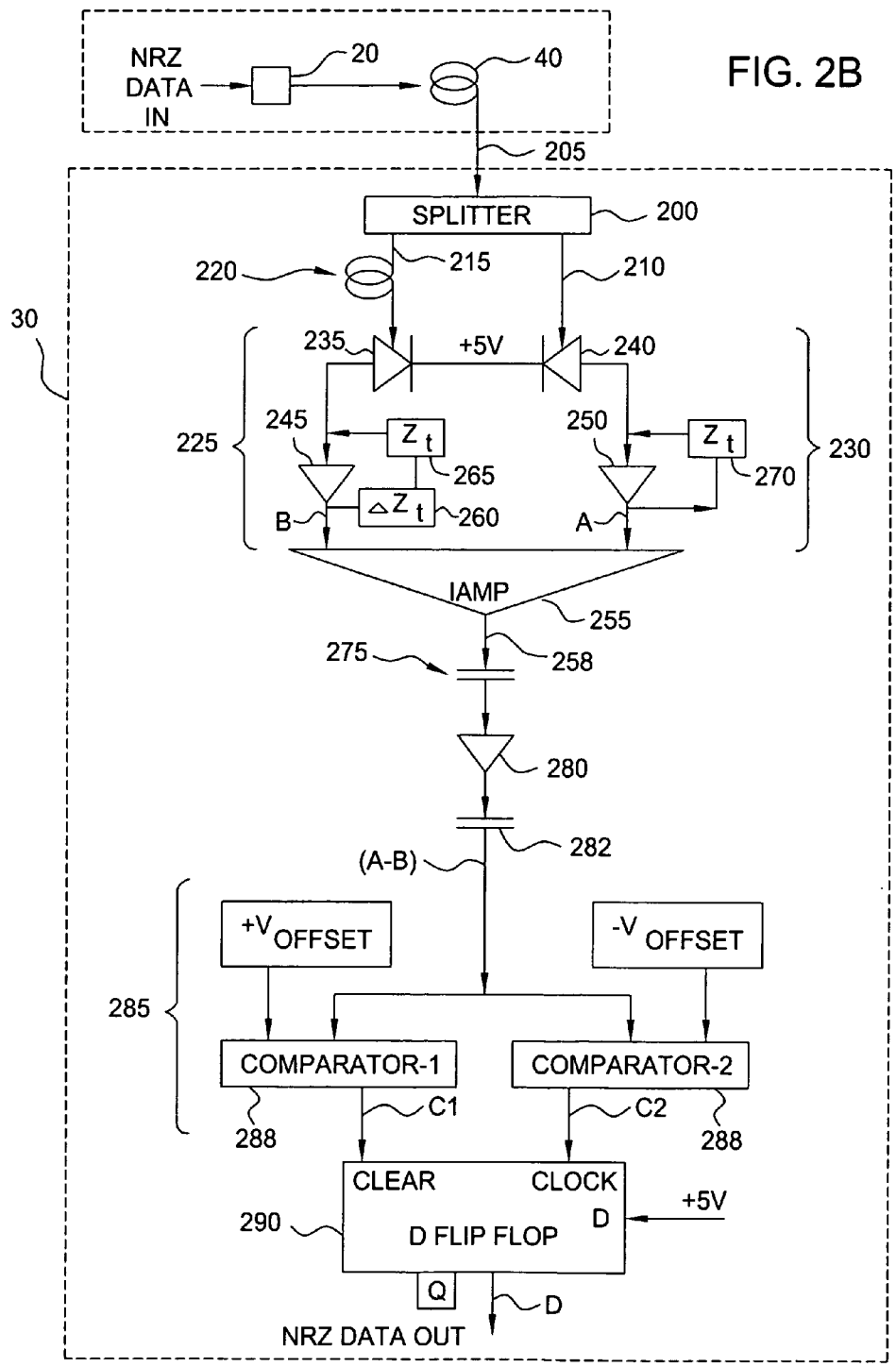
FIG. 2B is a circuit diagram of the burst mode power line receiver according to the present invention.

With reference to FIG. 2B, the BMPLR 30 includes a splitter 200 for at least splitting the input data bit stream 205, see FIG. 3, waveform (a), into first and second data bit streams 210, 215. Each bit in the bit stream 205 has an original pulse width. The splitter 200 can be an electro-optical splitter capable of electrically or optically splitting the input data bit stream 205, an electrical splitter capable of electrically splitting the input data bit stream 205, or an optical splitter capable of optically splitting the input data bit stream 205.

The second data bit stream 215 is delayed with respect to the first data bit stream 210 by a delay device 220. Preferably, the second data bit stream 215 is delayed by one-half bit to prevent deterioration of the Bit Error Rate (BER). The delay device 220 can be a length of optical fiber or an electrical delay device. The delay may be a finite, non-zero delay. In another embodiment, the delay may be anywhere from at least one-half a line encoded clock cycle to one full clock cycle. In one illustrative embodiment, the optical delay is one-half the NRZ pulse width ($T_b$) or clock cycle of the BMPLT 20 clock, as shown by the top waveform in FIG. 3.

Continuing, two optical-to-electrical (O/E) demodulators 225, 230 including PIN diode circuits 235, 240 and transimpedance amplifiers 245, 250 to convert optical signals to electrical signals A and B, see FIG. 3, waveforms (b) and (c). The two O/Es may be referred together as an optical-to-electrical converting device.

The BMPLR 30 further includes difference or subtraction circuitry 255 for generating a bipolar, difference (or differential, bipolar bit stream (DBRZ)) data bit stream 258 by subtracting information in the delayed, second data bit stream 215 from information in the first data bit stream 210. It should be noted that the delay device 220 determines the location of the second data bit stream 215. That is, the delay device 220 and, therefore, the second data bit stream 215 may be the left or right bit stream (looking at FIG. 2B).

The difference or subtraction circuitry 255 may include an amplifier or any other appropriate device which generates or identifies the difference between the first and second data bit streams 210, 215.

In the DBRZ data bit stream, a zero volt pulse indicates that a data bit is the same (either a repeating "1" or "0") as a previous bit, while an alternating, non-zero pulse indicates that a data bit has changed from a previous one. Non-zero pulses after subtraction have either a RZ pulse format or a bipolar balanced/symmetric full width NRZ pulse. Any unwanted signal due to unwanted background light, outside the signal bandwidth, is a common mode signal at the output of the PIN diodes 235, 240 and TIAs 245, 250 and is eliminated by the subtraction process.

The optical-to-electrical converter also includes at least one feedback device or differential feedback device ($\Delta Z_1$) 260 in the second data bit stream 215, to minimize electro-optical imbalances generated during the optical-to-electrical conversion process. Two feedback resistors 265, 270 also restore signal voltage to the first and second data bit streams 210, 215 which occur when the input data bit stream 205 is split, by doubling the resistance values of the feedback resistors 265, 270 without affecting the dynamic range of the receiver 30 compared to existing receivers.

The power spectral density (PSD) of the bipolar, difference data bit stream 258 is ideal for AC coupling and large amplification. Unwanted, low frequency signal components, such as DC voltages caused by non-linearities, imbalances and non-tracking of electrical and optical components in the first and second data bit streams 210, 215, are removed by an AC coupling capacitor 275 before amplification by amplifier 280, and AC coupling by capacitor 282 to form signal (A-B), see FIG. 3, waveform (d). A large signal gain is possible because DC voltage errors and temperature drift effects, which lead to the saturation of amplifier gain stages, are eliminated. Moreover, the large gain is also due to the elimination of base line wander. These eliminated effects are inherent in all existing AC and DC coupled receivers.

Once the bipolar, difference data bit stream 258 is output from the amplifier 280, it is input into threshold circuitry 285 for outputting a first bit when a voltage level of a first signal in the bipolar, difference data bit stream 258 exceeds a threshold voltage and outputting a second bit when a voltage level of a second signal in the bipolar, difference data bit stream 258 exceeds the threshold voltage.

Figure 4:
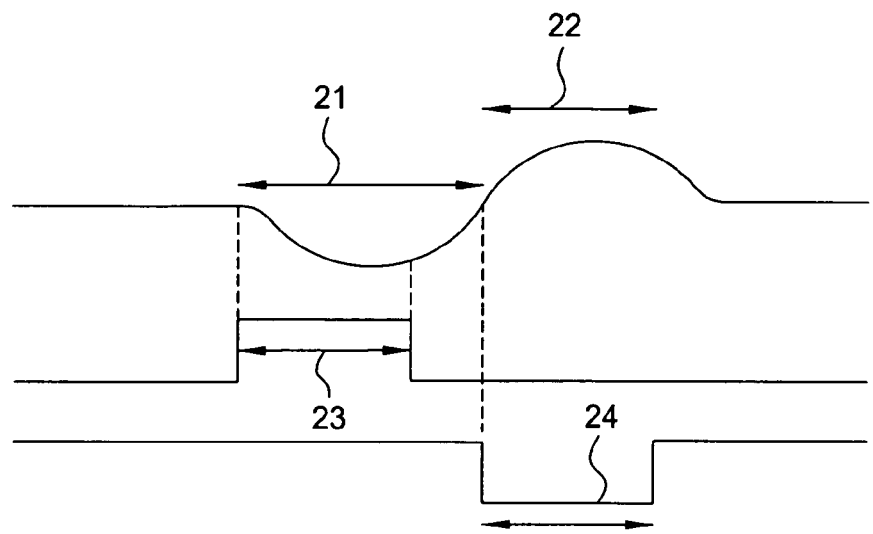
FIG. 4 depicts signals and bits generated by an illustrative embodiment of the present invention.

After filtering, a "decision" (or output) can be selected based on samples or threshold level crossings. Using this method, which does not require a sampling clock, a first signal 21 (see FIG. 4) of the bipolar, difference data bit stream 258 is detected and generates a first bit 23, when the first threshold (e.g., .+−$V_d$) is crossed or exceeded by a rising edge from zero volts to more than +$V_d$. A pulse train of inverted first bits, i.e., signals C1 and C2, see FIG. 3, waveforms (e) and (f), is then output from the threshold circuitry 285, which may include one or more comparators 288 or amplifier gain stages, to pulse regenerating circuitry 290 which preferably includes a D flip-flop (D-FF) or differential decoder.

The pulse regenerating circuitry 290 outputs the recovered NRZ data as the output, i.e., signal D, see FIG. 3, waveform (g). The circuitry 290 changes its output from a logical "0" to "1" at an edge of the first bit 23. The output remains at "1" until there is a crossing of the second threshold, e.g. $-V_d$, by a second signal 22 in the bipolar, difference data bit stream 258. A bit 24 generated by such a crossing will be referred to as a second bit. An edge of the second bit 24 is used to change the output of the circuitry 290 from a logical "1" to "0" by using the second bit as a "clear" input to the D-FF.

If amplifier gain stages are used as apart of the threshold circuitry 285 they may comprise cascaded amplifier gain stages.

In another embodiment of the invention, a single threshold may be used to create the first 23 and second 24 bits. To use a single threshold, an ideal threshold circuit includes two circuits, with their threshold tied together. The bit stream 258 is input into one circuit while an inverted version of the bit stream 258 is input into the second circuit. When a voltage of the first signal 21 exceeds the single threshold voltage in the first circuit, the first bit 23 is generated. Likewise, when the second, now inverted signal 22 exceeds the same single threshold in the second circuit, second bit 24 is generated. It should be noted that either the first or second signals 21, 22 may be inverted. Both the first and second circuits may be referred to as ideal threshold circuitry.

The output of the pulse regenerating circuitry 290 produces NRZ data bits which have a regenerated pulse width equal to the original pulse width of the NRZ pulse input to the splitter 200.

IV. Generation of a NRZ Data Bit

Figure 5:
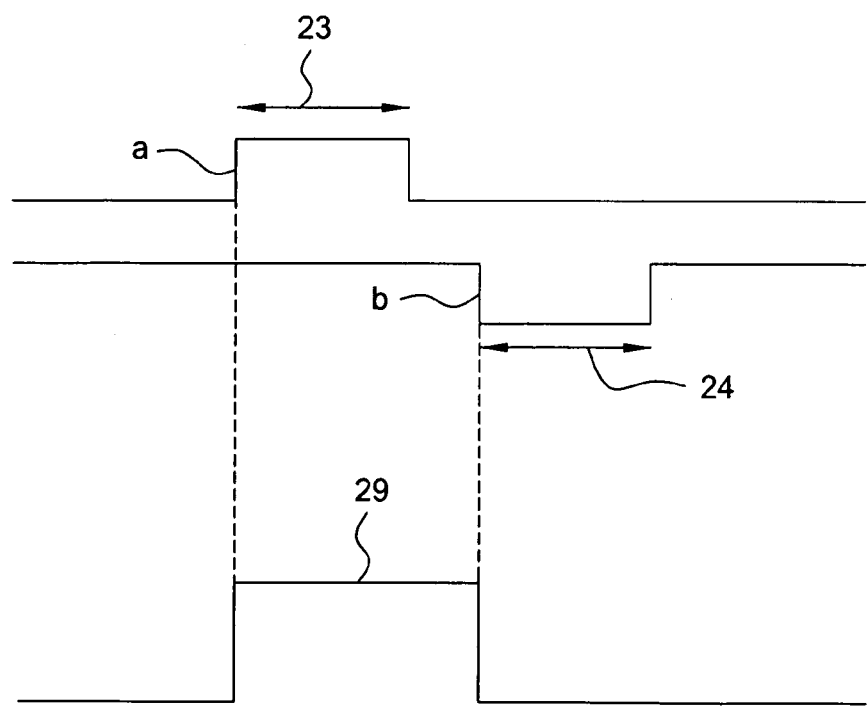
FIG. 5 depicts a regenerated line encoded bit according to an illustrative embodiment of the present invention.

FIG. 5 further illustrates how a NRZ data bit is regenerated. As shown, an edge, "a", of the first bit 23, in this case a leading edge although a trailing edge would work as well, marks the beginning of a regenerated NRZ data bit 29. Likewise, an edge "b" (again a leading edge or trailing edge) of the second bit 24 marks the end of the NRZ data bit 29. The time between the detection of edge "a" and edge "b" is a regenerated pulse width which is equal to the original pulse width of the same NRZ data bit originally input to splitter 200.

As stated before edges "a" and "b" may be leading or trailing edges, however, both edges must be either both leading or both trailing edges, i.e., "a" cannot be a leading edge, and "b" a trailing edge.

A receiver according to the above embodiment of the invention provides advantages and trade-offs over existing DC coupled receivers.

One trade-off is in input signal power. The splitter 200 has reduced the optical input signal power of the input data bit stream 205 to each of the PIN diodes 235, 240 by approximately 3 dB.

The upper limit of a receiver's dynamic range is usually limited by the saturation of a TIA, which restricts the size of the feedback resistance, $R_f$. In an embodiment of the present invention, because the power is split, the upper end of the inventive receiver's dynamic range is increased by 3 dB (optical). Because the maximum optical power is limited to $P_{in}/2$ for each bit stream 210, 215, $R_f$ can be increased by a factor of two without saturating the individual TIAs 245, 250. Feedback resistors 265, 270 used with each TIA can be $(2*R_f)$ without effecting overall dynamic range of the inventive BMPLR 30.

When two thresholds are used in the threshold circuitry 285 there is no need to use additional hysteresis thresholds or logic zero offset voltages as suggested for prior art burst mode communications devices. This amounts to a benefit of approximately 6 dB (electrical) or 3 dB (optical) as compared to existing AC or DC coupled burst mode receivers.

Using an AC coupled, bipolar, difference data bit stream there is no penalty due to temperature drifts, no voltage and current error build-ups, and no base line wander. Additional sensitivity gains are expected using data in an RZ format, due to decreased intersymbol interference.

Finally, rising and falling edges of NRZ pulses used in existing DC and AC coupled receivers introduce pulse width distortion due to changes in input optical power levels and variations in the electrical power supply being used. However, because of the use of symmetric first and second bits 23, 24, the pulse width of an original NRZ data bit remains constant irrespective of electrical power supply fluctuations or optical signal power input levels, further increasing the inventive receiver's sensitivity.

Several advantages of the burst mode power line data network system of the present invention is that carrier frequencies and their harmonics are eliminated and therefore signals can be scaled at higher data rates; interference is minimized, since the total time the signals are present on the power line is dramatically reduced; and there is no need for clock recovery in homes and businesses, and therefore modules for implementing the system are inexpensive. Further, the inventive data network system overcomes magnetic interference caused by the used of masers in power line communications.

It is to be understood that the above-described embodiments are merely illustrative of the many possible embodiments which can be devised to represent the application of the principles of the invention. Numerous and varied other arrangements can be devised in accordance with these principles by those skilled in the art without departing from the spirit and scope of the invention.

Finally, though some of the embodiments discussed above focused on burst mode power line data network system, the inventive apparatus and method is applicable to other networks as well.

What is claimed is:

1. A burst mode power line data network system comprising:

a burst mode transmitter coupled to an electrical power line connected to a plurality of communications devices, the burst mode transmitter comprising:

a transmitter supplying at least a single output data bit stream of line encoded bursts of information via the electrical power line to at least one of the plurality of communication devices, each data bit of the data bit stream having an original pulse width, the data bit stream including an information field indicating a first amount of delay to be used by the at least one of the plurality of communication devices after the at least one of the plurality of communication devices receives the data bit stream and before the at least one of the plurality of communication devices transmits to a burst mode receiver; and a delay delaying transmission of a received data bit stream by a predetermined second delay amount; and the burst mode receiver coupled to the electrical power line for receiving at least a single input data bit stream of line encoded bursts of information via the electrical power line.

2. The network system as in claim 1, wherein the burst mode receiver comprises:
   a splitter for splitting the at least single input data bit stream into a first data bit stream and a second data bit stream;
   a receiver delay for delaying information in the second data bit stream relative to information in the first data bit stream;
   a subtractor including an amplifier for generating a bipolar difference data bit stream from the information in the delayed second data bit stream and the information in the first data bit stream; and
   at least one comparator for outputting a first bit when a voltage level of a first signal in the bipolar difference data bit stream exceeds a threshold voltage and outputting a second bit when a voltage level of a second signal in the bipolar difference data bit stream exceeds the threshold voltage.

3. The network system as in claim 2, wherein the burst mode receiver further comprises a flip-flop for regenerating each data bit in the line encoded data bit stream using the first and second bits, each regenerated data bit having a regenerated pulse width equal to the original pulse width.

4. The network system as in claim 1, wherein the burst mode transmitter and the burst mode receiver are housed within a central node coupled to the electrical power line.

5. A burst mode power line data network system comprising:
   a first burst mode transmitter coupled to an electrical power line connected to a plurality of communications devices, the first burst mode transmitter comprising:
      a transmitter for transmitting at least a single output data bit stream of line encoded bursts of information via the electrical power line to at least one of a plurality of burst mode receivers, each data bit of the data bit stream having an original pulse width, the data bit stream including an information field indicating a first amount of delay to be used by a second burst mode transmitter associated with the at least one of the plurality of burst mode receivers after the at least one of the plurality of burst mode receivers receives the data bit stream and before the second burst mode transmitter transmits to a burst mode receiver associated with the first burst mode transmitter; and
   a delay delaying transmission of a received data bit stream by a predetermined second delay amount; and
   the burst mode receiver associated with the first burnt mode transmitter and coupled to the electrical power line for receiving at least a single received data bit stream of line encoded bursts of information via the electrical power line.

6. The network system as in claim 5, wherein the burst mode receiver associated with the first burst mode transmitter comprises:
   a splitter for splitting the at least single received data bit stream into a first data bit stream and a second data bit stream;
   a second delay arranged to delay information in the second data bit stream relative to information in the first data bit stream;
   a subtractor including an amplifier for generating a bipolar difference data bit stream from the information in the delayed second bit stream and the information in the first data bit stream; and
   at least one comparator for outputting a first bit when a voltage level of a first signal in the bipolar difference data bit stream exceeds a threshold voltage and outputting a second bit when a voltage level of a second signal in the bipolar difference data bit stream exceeds the threshold voltage.

7. The network system as in claim 6, further comprising a flip-flop regenerating each data bit in the line encoded data bit stream using the first and second bits, each regenerated data bit having a regenerated pulse width equal to the original pulse width.

* * * * *